(12) United States Patent
de la Barré et al.

(10) Patent No.: US 9,497,449 B2
(45) Date of Patent: Nov. 15, 2016

(54) MONITOR AND A METHOD FOR REPRESENTING AUTOSTEREOSCOPICALLY PERCEIVABLE PICTURES

(75) Inventors: René de la Barré, Mitweida (DE); Hans Röder, Berlin (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 907 days.

(21) Appl. No.: 13/383,931

(22) PCT Filed: Mar. 3, 2010

(86) PCT No.: PCT/EP2010/001596
§ 371 (c)(1),
(2), (4) Date: Mar. 8, 2012

(87) PCT Pub. No.: WO2011/006551
PCT Pub. Date: Jan. 20, 2011

(65) Prior Publication Data
US 2012/0154395 A1 Jun. 21, 2012

(30) Foreign Application Priority Data

Jul. 17, 2009 (DE) .................... 10 2009 034 355

(51) Int. Cl.
*G06T 15/00* (2011.01)
*H04N 13/04* (2006.01)

(52) U.S. Cl.
CPC ...... *H04N 13/0497* (2013.01); *H04N 13/0404* (2013.01); *H04N 13/0409* (2013.01); *H04N 13/0415* (2013.01); *H04N 13/0422* (2013.01)

(58) Field of Classification Search
CPC ............... H04N 13/0409; H04N 13/0415; H04N 13/0422; H04N 13/0404; H04N 13/0497
USPC .......................................... 348/51; 345/419
See application file for complete search history.

(56) References Cited

U.S. PATENT DOCUMENTS 6,064,424 A * 5/2000 van Berkel et al. ............ 348/51
8,130,272 B2 3/2012 Pastoor et al.
(Continued)

FOREIGN PATENT DOCUMENTS

DE 102004059729 B3 4/2006
DE 102006031799 B3 1/2008
(Continued)

OTHER PUBLICATIONS

De La Barre et al. (DE102006031799B3) translation, Jan. 10, 2008, [0001], [0002], [0017], [0031], [0057], and figs. 3/6/8.*
International Preliminary Report on Patentability issued in PCT/EP2010/001596, mailed Jan. 26, 2012, 9 pages.

*Primary Examiner* — Farzana Hossain
*Assistant Examiner* — Matthew Kwan
(74) *Attorney, Agent, or Firm* — Faegre Baker Daniels LLP

(57) ABSTRACT

A monitor for representing autostereoscopically, three-dimensionally perceivable pictures includes a matrix screen with a multitude of subpixels which are arranged in lines and columns and which may be changed in their illumination intensity and may be put together into a multitude of picture points, a control device for activating the subpixels in dependence on picture information of at least two stereoscopic fields, in a manner such that the picture points are divided in at least two subgroups for reproducing in each case one of the fields, and a barrier raster, with which light coming from the picture points of each of the subgroups may be led into in each case one of several observation zones which lie in a laterally displaced manner, said one of several observation zones being assigned to this subgroup by way of this.

17 Claims, 3 Drawing Sheets

(56) References Cited

U.S. PATENT DOCUMENTS

| | | |
|---|---|---|
| 8,319,824 B2 | 11/2012 | De La Barre et al. |
| 2008/0211977 A1 | 9/2008 | Ijzerman et al. |
| 2009/0123030 A1* | 5/2009 | De La Barre et al. ....... 382/103 |
| 2009/0278936 A1* | 11/2009 | Pastoor et al. ................ 348/169 |
| 2012/0154395 A1 | 6/2012 | de la Barre et al. |

FOREIGN PATENT DOCUMENTS

| | | |
|---|---|---|
| EP | 0791847 A1 | 8/1997 |
| WO | WO 2006069555 A1 * | 7/2006 |

* cited by examiner

US 9,497,449 B2

MONITOR AND A METHOD FOR REPRESENTING AUTOSTEREOSCOPICALLY PERCEIVABLE PICTURES

RELATED APPLICATIONS

This application is a national phase application of PCT/EP2010/001596, internationally filed on Mar. 3, 2010, and is filed pursuant to 35 U.S.C. §371, which also claims priority to German Application No. 10 2009 034 355.5, filed Jul. 17, 2009, which are herein incorporated by reference in their entirety.

TECHNICAL FIELD

The invention relates to a monitor for representing pictures which may be perceived in an autostereoscopic and three-dimensional manner, which may also be called a 3D-monitor, 3D-display or autostereoscopic screen. Moreover, the invention relates to a corresponding method for representing pictures which may be perceived in an autostereoscopic, three-dimensional manner.

BACKGROUND

A monitor of the known type includes a matrix screen with a multitude of subpixels arranged in lines and columns, which may be changed in their illumination intensity and may be grouped in to a multitude of picture points in each case including several subpixels, and a control device for activating the subpixels in dependence on picture information of at least two stereoscopic fields, in a manner such that the picture points are divided into at least two subgroups for reproducing in each case one of the fields, wherein the control device is set up to activate the subpixels within each of the picture points, with an illumination intensity which additionally to the picture information is line-by-line weighted in a subpixel-dependent manner. Moreover, such a monitor includes a barrier raster, with which light coming from the picture points of each of the subgroups may be led into in each case one of several observation zones which are laterally displaced to one another. Thereby, the barrier raster is typically designed as a slot raster, wherein the terms barrier raster and slot raster in the present document, apart from a screen with slots, are generally also to be understood as other optical arrangements having the same effect.

Such a monitor is described in the document DE 10 2006 031 799 B3. This and other monitors known from the state of the art may be divided into two classes, specifically into single-person screens, with which the picture points are divided onto two sub-groups for representing in each case one of two stereoscopic fields, wherein light coming from each of these fields is thrown in each case into one of two stereo-observation zones for two eyes of a single observer, and into multi-person screens or multi-view displays, with which the picture points for representing a larger number of views are distributed onto a correspondingly larger number of subgroups, and light coming from each of these subgroups is led in each case into one of correspondingly many observation zones. In the last mentioned case, also several persons may autostereoscopically perceive the reproduced pictures. An individual observer then with a lateral movement, may move through different observation zones and in this manner perceive different views of a represented scene, in each case in a three-dimensional manner, without a tracking for single-person screens being necessary for this.

So that a transition from one observation zone into the next may not be perceived or hardly be perceived by the observer, one lets the observation zones merge into one another, which causes a relatively high mutual cross-talk of different stereo-channels. For this reason, the type of picture reproduction used for multi-person screens is less suitable for some scenes. With these multi-person screens, an observation distance typically lies at double or triple the format diagonal, and in particular is larger than normal observation distances of individual screens of comparable size.

However, it is not possible with known 3D-monitors to selectively realize both outlined types of three-dimensional picture reproduction—thus an operation as a multi-person screen or as a single-person screen, since each of these 3D-monitors in each case is only suitable for one of the two types of picture reproduction, due to geometric limitations. This entails the disadvantage that a 3D-monitor of the state of the art which may be applied as a multi-person screen, must be operated as a multi-view display, even if only a single person uses this 3D-monitor, although theoretically a better picture quality may be realized with the other type of picture reproduction, with a corresponding pixel number.

SUMMARY

It is therefore an object of the invention to develop a 3D-monitor, which may be selectively operated as a multi-person screen or as a single-person screen and thus avoids the mentioned disadvantages. It is further an object of the invention to suggest a method for representing autostereoscopic pictures, with which both types of picture reproduction described above, may be realized using a single 3D-monitor.

With a monitor according to the invention, the control device—this typically by way of a suitable programming—is set up to activate the matrix screen, alternatively to a first operating mode also, in a second operating mode by way of the subpixels in each of the used lines of the matrix screen in each case being distributed onto a larger number of picture points and by way of the picture points being divided into a larger number of subgroups for representing in each case a stereoscopic field, than in the first mode, wherein the control device is further set up to activate the subpixels in at least one of the two operating modes within the picture points, with illumination intensities which are weighted in a subpixel-dependent manner, in a manner such that a lateral distance of intensity centroids of adjacent picture points in a first operating mode differs from each integer multiple of a lateral distance of intensity centroids of adjacent picture points in the second operating mode. The term intensity centroid may, in this context, also denote the respective intensity maximum.

By way of this, the monitor is suitable for an operation in two different operating modes, which differ from one another by a different number of observation zones. In particular, by way of this, it is possible to use the monitor as a multi-person screen (so-called multi-view operation) as well as a single person screen (so-called single user screen), and specifically selectively by switching between both operating modes. For this, the monitor in the first operating mode may be designed as a single-person screen for representing exactly two stereoscopic fields, and in a second operating mode may be designed as a multi-person screen or multi-view screen for representing a larger number of stereoscopic fields. Designs with which both modes, although envisaging in each case more than two observation zones, but however have a different number and different distances to the matrix screen are also possible.

Geometrically caused restrictions, which result due to the fact that the barrier raster has a fixed period length—given e.g. by a slot distance—and that the matrix screen has a fixed lateral subpixel distance, and which have rendered such a comprehensive use of a single monitor impossible until now, thereby are overcome by way of the subpixels in at least one of the operating modes, within the picture points, being activated in a manner which is weighted in a subpixel-dependent manner.

The control device may thereby be set up such that the subpixels in one of the two operating modes or in both operating modes, within each of the picture points, are activated in such a weighted manner, that a distance of intensity centroids of laterally adjacent picture points differs from each integer multiple of a lateral distance of adjacent subpixels.

With the suggested method for representing autostereoscopically perceivable pictures, which may be carried out with a monitor of the described type, accordingly a multitude of picture points are formed on a matrix screen by way of in each case one or more subpixels which may be changed in their illumination intensity, wherein at least two sub-groups of the picture points in each case image one of at least two stereoscopic fields combinable into a stereo-picture, and wherein light coming from each of these subgroups of picture points is led through a barrier raster into in each case one of at least two observation zones which lie next to one another and which are assigned to this sub-group by way of this. Thereby, the monitor is switched between different operating modes, which differ from one another by way of the fact that the subpixels in a second operating mode within each screen line are distributed onto a greater number of picture points, and the picture points in the second operating mode are divided into a larger number of sub-groups for representing in each case a stereoscopic field, than in a first operating mode, wherein the subpixels in at least one of the two operating modes, within the picture points, are activated with illumination intensities which are weighted in such a subpixel-dependent manner, that a lateral distance of intensity centroids of adjacent picture points in a first operating mode differs from each integer multiple of a lateral distance of intensity centroids of adjacent picture points in the second operating mode. With this method, advantageously with a low effort, autostereoscopically perceivable 3D-pictures are reproduced in different manners, so that a respective optimal reproduction type may be selected depending on how many observers are to see the 3D-pictures, and depending on the number of available views or stereoscopic fields.

Thereby, for activating the subpixels with the light intensity weighted in a subpixel-dependent manner within each of the picture points, in a manner which is simple to realize with regard to programming technology, an intensity value for a picture point for each subpixel of the picture point, which results from the picture information, may be multiplied by a value of a weighting function, wherein this weighting function is independent of the picture information, and a weight which is location-dependent within each screen line is defined by this weighting function for each subpixel of the picture point.

The presently described invention does not exclude a blanking of individual subpixels on writing picture information to be represented, into the matrix screen. Thus it is possible for individual subpixels—in particular those which an observer may see with both eyes with a given head position—to remain dark. This may be realized by way of a weighting function used for the weighted activation of the subpixels, under certain circumstances—in particular for subpixels at the edge of a picture point—also assuming the value zero, as well as by way of individual subpixels simply being left out when writing in the picture information. Finally, it is also possible in particular with a single user operation with a tracking of the eye position of the observer, corresponding to the first operating mode, to assign subpixels depending on the eye position sometimes to one picture point of the one subgroup and other times to another picture point of the other subgroup.

In some embodiments, the picture points in both operating modes are assigned in each case line-by-line in a cyclical sequence to the different subgroups, so that the light coming from the picture points of the different subgroups may be led with a barrier raster which is constructed as simply as possible, into the observation zone assigned to the respective subgroup. For this, the barrier raster may e.g. include grid lines running parallel to a column direction of the matrix screen or inclined thereto, prism elements or cylinder lenses. The matrix screen with advantageously simply constructed designs of suitable monitors may e.g. be given by a liquid crystal screen.

In some embodiments, the control device of the monitor is set up such that the subpixels in at least one of the two operating modes are activated within the picture points with light intensities which are subpixel-dependently weighted in a manner such that a lateral distance of intensity centroids in a line of picture points lying closest to one another from one of the subgroups, in a first operating mode, also differs from a lateral distance of intensity centroids in a line of picture points lying closest to one another from one of the subgroups, in the second operating mode. By way of this, one may succeed in the stereoscopic fields in each operating mode being able to be seen in an optimally distanced manner to the barrier raster at an observation distance which is characteristic of this operating mode.

In some embodiments of the monitor, the intensity centroids of the picture points of each subgroup thereby in the first operating mode are arranged such that light coming from each of these intensity centroids falls through the barrier raster centrally into the observation zone assigned to the respective subgroup, distanced to the barrier raster by a first observation distance, while the intensity centroids of the picture points of each subgroup in the second operating mode are arranged such that light coming from each of these intensity centroids falls through the barrier raster centrally into the observation zone assigned to the respective sub-group, distanced to the barrier raster by a second observation distance. In some embodiments, the second observation distance thereby is larger than the first observation distance. Simultaneously, a larger number of observers may be placed in a more comfortable manner at a greater distance to the screen, while an individual observer may get closer to the screen without disturbing the other observers.

In some embodiments, the picture points in the first operating mode are in each case formed from a—the same for all picture points of this operating mode—larger number of subpixels than in the second operating mode, in which a larger number of picture points are required. In order to also permit a representation of colored pictures with simple means, each of the picture points may contain subpixels of three different colors, in each case in the same number. Instead of this however, one may of course also use subpixels which may be tuned in a colored manner. In the first mentioned case, with regard to an as color-neutral as possible effect of a lateral movement of an observer, it is advantageous if the picture points in each case contain subpixels from at least three consecutive lines, wherein the picture points in the first operating mode in each case contain at least three adjacent subpixels from each of these lines, while the picture points in the second operating mode in each case contain less subpixels from each of these lines, than the picture points in the first operating mode.

In some embodiments, one may choose a simple structure for the barrier raster, which is typically designed as a slot raster, if the picture points of each subgroup are arranged in each case along a family of equidistant parallel straight lines which intersect the lines.

BRIEF DESCRIPTION OF THE FIGURES

One embodiment of the invention is explained hereinafter by way of the FIGS. 1 to 3. There are shown in.

DETAILED DESCRIPTION

Figure 1:
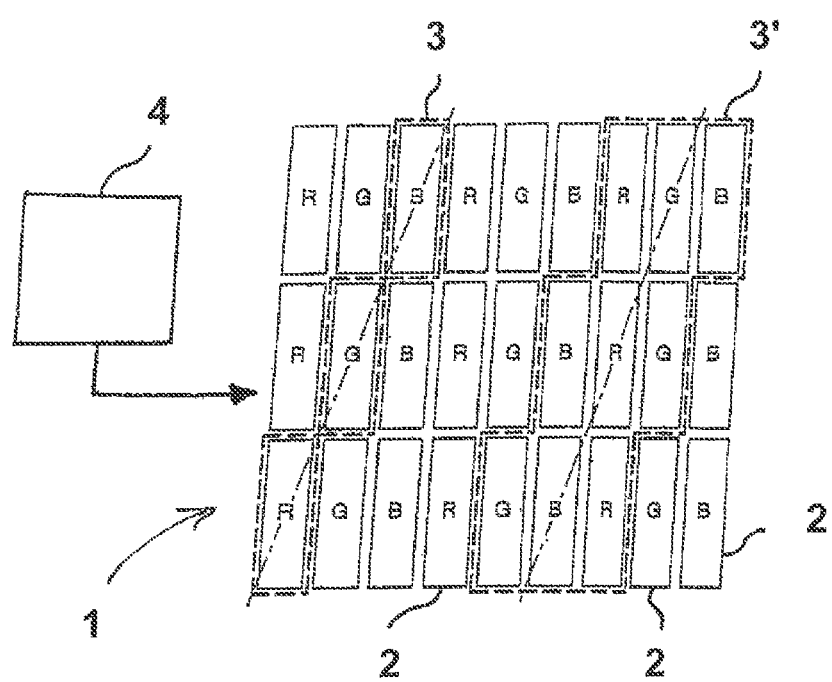
FIG. 1 a detail of a pixel plane of a matrix screen which forms a main component of a 3D-monitor.

The illustrated embodiment is a 3D-monitor which may be operated selectively in a first operating mode as a single person screen or in a second operating mode as a multi-person screen, and which may be switched between these two operating modes or operating types. As a main component, this 3D-monitor includes a matrix screen 1 given by a liquid crystal screen, with a multitude of subpixels 2 which are arranged in lines and columns, may be changed in their intensity and of which a detail of a pixel plane is shown in FIG. 1. Subpixels 2 of red, green and blue color, which are characterized in FIG. 1 by the letters R, G and B, alternate in a cyclical manner in each line of the matrix screen 1, wherein in each case subpixels 2 of the same color are arranged above one another in the columns. Of course, with other embodiments, suitable 3D-monitors with other arrangements of the subpixels 2 would also be possible. The individual subpixels 2 have a width p for example of 0.085 mm and are dimensioned such that three subpixels 2 lying next to one another in each case complement one another into a square.

In each of the mentioned operating modes, the subpixels 2 in each case are put together in a grouped manner into picture points 3 or 3' including several subpixels 2, and specifically in the second operating mode into picture points 3 in each case with a red, a green and a blue subpixel 2, and in a first operating mode into larger picture points 3' with in each case three red, three green and three blue subpixels 2. Each of the picture points 3 and 3' extends over three lines, wherein the picture points 3' in the first operating mode in each case contain three adjacent subpixels 2 from each of these lines. Thereby, the colors of these three subpixels 2 are in each case cyclically interchanged with respect to the colors of the three subpixels 2 from the other lines of the same picture point 3'. The subpixels 2 of the picture points 3 in the second operating mode as well as the subpixels 2 of the picture points 3' in the first operating mode thereby in each case form an elongate strip which is inclined by about 20° out of a column direction of the matrix screen 1, wherein the strips formed by the picture points 3 in the second operating mode run parallel to the strips formed by the picture points 3' in the first operating mode.

In the first operating mode as well as in the second operating mode, the picture points 3 and 3' are in each case put together into subgroups, on which in each case one of several views of a stereo-picture made visible with the 3D-monitor is reproduced. Each of these views thereby forms a stereoscopic field of the respective stereopicture. For this, the subpixels are activated with a control device 4 which is set up in a suitable manner with regard to programming technology and is represented schematically in FIG. 1, in dependence on the picture information of these stereoscopic fields, wherein the control device 4 is set up to activate the matrix screen 1 selectively for an operation in each of the two operating modes and when required to switch over between these operating modes.

The picture points 3 and 3' of each of the mentioned subgroups thereby are arranged in each case along a family of equidistant parallel straight lines, of which in FIG. 1 in each case one is drawn in as a dot-dashed line for both operating modes and which are inclined with respect to the column direction of the matrix screen 1, just as the strips formed from the respective picture points 3 and 3'.

In the second operating mode, the picture points are divided into a multitude of m subgroups, wherein m in the present example is to be selected as m=6, and wherein m different views which are to be visible in each case from one of m observation zones lying next to one another, are to be reproduced on these subgroups. The picture points 3 of these m subgroups are arranged on the matrix screen 1 such that picture points 3 of the m subgroups alternate in a cyclic manner in each line, when the 3D-monitor is operated in the second operating mode, thus as a multi-person screen. In the first operating mode, the larger picture points 3' are divided onto a first subgroup, which is to be visible for a left eye of a single observer, and onto a second subgroup which is to be visible to a right eye of this observer, wherein the picture points 3' of these two subgroups in a first operating mode are distributed on the matrix screen 1, in a manner such that picture points 3' of the first subgroup alternate with picture points 3' of the second subgroup, in each line. In the first operating mode, in each case one of two stereoscopic fields are represented on the picture points 3' of each of these two subgroups, so that the one observer may autostereoscopically perceive a stereo-picture when his left eye is located in a left observation zone and his right eye in a right observation zone of only two laterally periodically repeating observation zones in this first operating mode.

Figure 2:
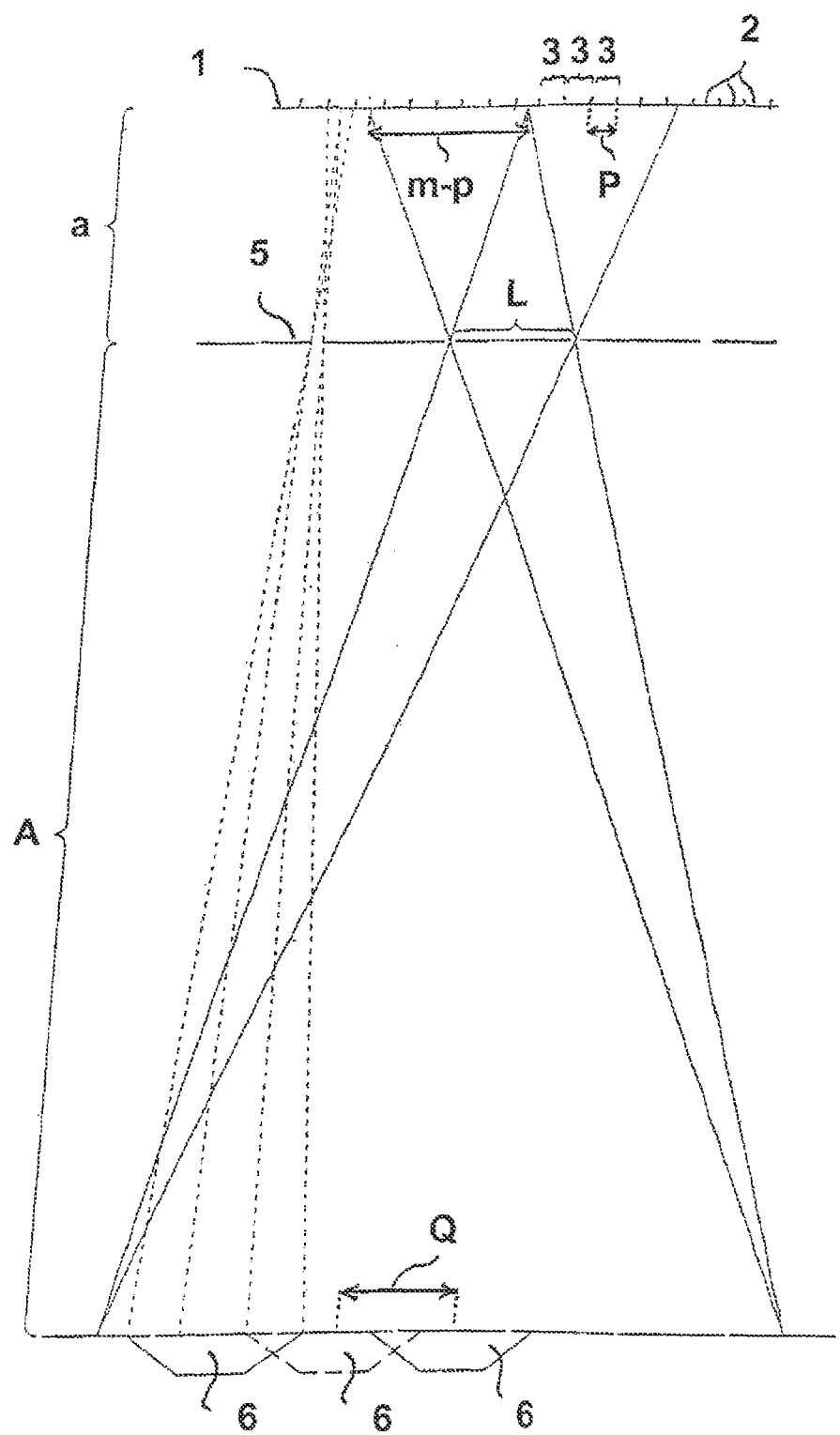
FIG. 2 in a schematic representation, a plan view of a beam path of this 3D-monitor and FIG. 3 in a representation corresponding to FIG. 2, the same 3D-monitor in another operating mode.

A view of the described 3D-monitor with an operation in the second operating mode is shown in FIG. 2 in a schematic manner. Here, a cross section running from the matrix screen 1 along a line is to be recognized, wherein borders between two adjacent subpixels 2 of the matrix screen 1 are here marked by way of short dashes perpendicular to the pixel plane.

A barrier raster 5 orientated parallel to the matrix screen 1 is arranged at a small distance a to the pixel plane of the matrix screen 1, and here the barrier raster is represented as a slot raster with a slot distance L between adjacent slots. These slots thereby are orientated parallel to the straight line, along which the picture points 3 and 3' of the individual subgroups are arranged. Instead of the slot raster with grid lines inclined with respect to a column direction of the matrix screen 1, with other embodiments one may also e.g. provide prism elements or cylinder lenses, wherein a grid line direction may also run parallel to the column direction of the matrix screen, if the colored subpixels 2 are arranged differently.

As may be recognized in FIG. 2, light coming from the picture points 3 of each of the m subgroups is led through the barrier raster 5 into in each case one of several observation zones 6 which lie laterally displaced and which overlap in the edge regions, wherein the picture points 3 in the second operating mode represented here, in each case have the width of a subpixel 2 in each line.

The barrier raster 5 is dimensioned such that in the second operating mode, light coming from each of the m disjunctly paired subgroups of picture points 3, falls through the barrier raster 5 in each case into one of m observation zones 6 lying next to one another, distanced at a second observation distance A to the barrier raster 5. In some embodiments, a distance Q between intensity centroids of adjacent observation zones 6 in the first mode is slightly smaller than an average eye distance, so that an observer with a lateral movement, with which each of his eyes moves from one of the observation zone 6 into an adjacent observation zone 6, may perceive a stereopicture at each time.

Therefore, the following applies for the distance a between the pixel plane and the barrier raster 5 and for the slot distance L $$A=pA/Q \text{ and } L=mpA/(A+a)$$

which for m=6 (corresponding to 6 stereo-channels for a multi-view operation) and p=0.085 mm leads for example to the values a=2.29 mm and L=0.509334 mm, when the observation distance A in the second operating mode is to be fixed as A=1750 mm and when furthermore Q=65 mm is selected (in practice Q is typically selected somewhat smaller). These are realistic values if e.g. a 20.1" LC screen is used as a matrix screen.

The picture points 3 of each of the subgroups in this operating mode thus in the respective observation zone 6 result in one of m views which may be perceived by one or more persons as complementing stereoscopic fields.

Figure 3:
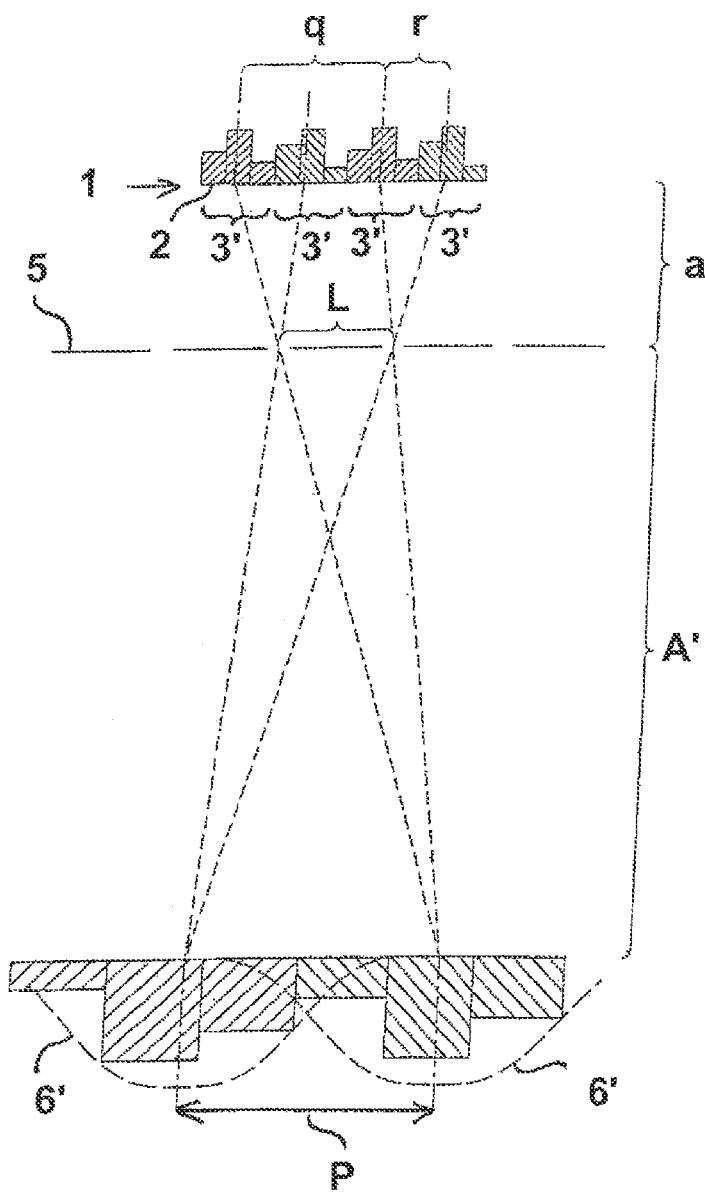

Now in FIG. 3—despite not being shown true to scale—the same 3D-monitor is shown with an operation in the first operating mode. The picture points 3' which are larger in the first operating mode are distributed onto only two subgroups, of which each serves for reproducing one of now only two stereoscopic fields.

Light which comes from a first of the two subgroups of picture points 3' now falls through the barrier raster 5 into a left observation zone 6' for a left observer eye, wherein this observation zone 6' lies distanced to the barrier raster 5 at an observation distance A' which is smaller compared to A. Light coming from the remaining subgroup of picture points 3' falls through the barrier raster 5 into a right observation zone 6' for a right observer eye, lying at the same observation distance A' to the barrier raster 5. A distance P between intensity centroids of the two observation zones 6' corresponds to a typical eye distance of about 65 mm, wherein the observation distance may now be selected e.g. as A'=750 mm.

In the first operating mode, the subpixels 2 are activated by way of the mentioned control device 4 within each of the picture points 3', with an light intensity which, additionally to the picture information of the stereoscopic fields to be represented, is subpixel-dependently weighted in a manner, such that a lateral distance r of intensity centroids of adjacent picture points 3' in the first operating mode differs from each integer multiple of a lateral distance of intensity centroids of adjacent picture points 3 in the second operating mode, and from each integer multiple of a lateral distance of adjacent subpixels. With the present embodiment example, the distance r thus differs from each integer multiple of the width p, and in particular from triple the width p, which here corresponds the distance of adjacent subpixels 2 with respect to the area centroids of the subpixels 2, as well as to the lateral distance of intensity centroids of adjacent picture points 3 in the second operating mode.

In order to succeed in the intensity centroids within the picture points 3' lying displaced with respect to an area centroid of these picture points 3', thereby an intensity value resulting from the picture information of the fields, for a picture point 3' for each subpixel 2 of the picture point 3', is multiplied by a value of a weighting function, by way of the suitably programmed control device 4, wherein this weighting function is independent of the picture information, and a weight which is location-dependent within each screen line is defined for each subpixel 2 of the picture point 3'.

It is only by way of these measures that one succeeds in the intensity centroids of the picture points 3' of each subgroup being arranged in the first operating mode such that light coming from each of these intensity centroids falls through the barrier raster 5 centrally into the observation zone 6' assigned to the respective subgroup, distanced to the barrier raster 5 at a first observation distance A', while the intensity centroids of the picture points 3 of each subgroup in the second operating mode are arranged such that light coming from each of these intensity centroids falls through the barrier raster 5 which is fixed in its dimensions, centrally into the observation zone 6 assigned to the respective subgroup, distanced to the barrier raster 5 at a second observation distance A.

Due to these described measures, finally it results that the subpixels 2 in the first operating mode, within the picture points 3', are also activated with illumination intensities weighted in a subpixel-dependent manner, in a manner such that a lateral distance q of intensity centroids in a line of picture points 3' located closest to one another, from in each case one of the two subgroups, in a first operating mode differs from a lateral distance m·p of intensity centroids in a line of picture points 3 situated closest to one another from any of the subgroups in the second operating mode.

The weighting functions thereby are selected such that $$r=Pa/A' \text{ and } q=(1+a/A')L$$

which in the previously mentioned example leads to the values r=0.198 mm and q=0.511 mm.

In FIG. 3, the mentioned weighting functions which assume three values for each picture point 3', since there, in each case three subpixels 2 lying next to one another in a line are assigned to the same picture point 3', are represented in a hatched manner for four adjacent picture points 3'. The weighting functions may thereby furthermore be redefined in dependence on a detected head position of an observer, in order to track the observation zones 3'—more accurately: intensity centroids of the observation zones 3'- to a head movement in this operating mode.

The invention claimed is:
1. A monitor for representing autostereoscopically, three-dimensionally perceivable pictures, the monitor comprising:
a matrix screen with a multitude of subpixels which are arranged in lines and columns and which may be changed in their illumination intensity and may be put together into a multitude of picture points;

a control device for activating the subpixels in dependence on picture information of at least two stereoscopic fields, in a manner such that the picture points are divided in at least two subgroups for reproducing in each case one of the fields; and a barrier raster, with which light coming from the picture points of each of the subgroups may be led into in each case one of several observation zones which lie in a laterally displaced manner, said one of several observation zones being assigned to this subgroup by way of this, the control device being set up to activate the matrix screen alternatively in a single-person screen mode for representing two stereoscopic fields and in a multi-person screen mode for representing a larger number of more than two stereoscopic fields, wherein the picture points, at least in the single-person screen mode, in each case comprise several subpixels and wherein the subpixels in the multi-person screen mode in each of the lines are in each case distributed onto a larger number of picture points than in the single-person screen mode and the picture points in the multi-person screen mode are divided into a larger number of subgroups for representing in each case a stereoscopic field than in the single-person screen mode such that, in the single-person screen mode, the picture points are divided into two subgroups for representing in each case one of two stereoscopic fields while, in the multi-person screen mode, the picture points are divided into more than two subgroups for representing in each case one of more than two different stereoscopic fields, wherein the control device is further set up to activate the subpixels in the single-person screen mode within each of the picture points with an illumination intensity which is weighted in a line-by-line subpixel-dependent manner additionally to the picture information, the illumination intensities of the subpixels being subpixel-dependently weighted in a manner such that a lateral distance of intensity centroids of adjacent picture points in the single-person screen mode differs from each integer multiple of a lateral distance of intensity centroids of adjacent picture points in the multi-person screen mode.

2. The monitor of claim 1, wherein the control device is set up to activate the subpixels in the single-person screen mode within each of the picture points, in such a weighted manner that a distance of intensity centroids of laterally adjacent picture points differs from each integer multiple of a lateral distance of adjacent sub pixels.

3. The monitor of claim 1, wherein, in the single-person screen mode and in the multi-person screen mode, the picture points are assigned in each case in a lined manner in a cyclical sequence to the different subgroups.

4. The monitor of claim 1, wherein the control device is set up to activate the subpixels in the single-person screen mode, within the picture points, with illumination intensities which are subpixel-dependently weighted in a manner such that a lateral distance of intensity centroids of picture points from one of the subgroups lying closest to one another in a line, in the single-person screen mode, differs from a lateral distance of intensity centroids of picture points from one of the subgroups lying closest to one another in a line, in the multi-person screen mode.

5. The monitor of claim 1, wherein the intensity centroids of the picture points of each subgroup in the single-person screen mode are arranged such that light coming from each of these intensity centroids falls through the barrier raster centrally into the observation zone assigned to the respective subgroup, distanced to the barrier raster at a first observation distance, whilst the intensity centroids of the picture points of each subgroup in the multi-person screen mode are arranged such that light coming from each of these intensity centroids falls through the barrier raster centrally into the observation zone assigned to the respective subgroup, distanced to the barrier raster at a second observation distance.

6. The monitor of claim 5, wherein the second observation distance is larger than the first observation distance.

7. The monitor of claim 1, wherein the picture points in the single-person screen mode are formed in each case from a larger number of subpixels than in the multi-person screen mode, said larger number being the same for all picture points of this single-person screen mode.

8. The monitor of claim 1, wherein each of the picture points contains subpixels of three different colours, in each case in the same number.

9. The monitor of claim 1, wherein the picture points in each case contain subpixels of at least three consecutive lines, wherein the picture points in the single-person screen mode in each case contain at least three adjacent subpixels from each of these lines, while the picture points in the multi-person screen mode in each case contain less subpixels from each of these lines, than the picture points in the single-person screen mode.

10. The monitor of claim 1, wherein the picture points of each subgroup in each case are arranged along a family of equidistant parallel straight lines which intersect the lines.

11. The monitor of claim 1, wherein the matrix screen is given by a liquid crystal screen.

12. The monitor of claim 1, wherein the barrier raster comprises grid lines running parallel to a column direction of the matrix screen or inclined thereto, prism elements or cylinder lenses.

13. A method for representing pictures which may be perceived in an autostereoscopic, three-dimensional manner, the method comprising:

forming, on a monitor with a matrix screen, a multitude of picture points by in each case one or more subpixels which may be changed in their illumination intensity, wherein at least two subgroups of the picture points in each case image one of at least two stereoscopic fields combinable into a stereo picture, and wherein light coming from each of these subgroups of picture points is led through a barrier raster into in each case one of at least two observation zones which lie next to one another and said one zone being assigned to this subgroup by way of this; and a step of switching the monitor between a single-person screen mode, in which two stereoscopic fields are represented, and a multi-person screen mode, in which a larger number of more than two stereoscopic fields are represented, wherein the picture points, at least in the single-person screen mode, in each case comprise several subpixels and wherein the subpixels in the multi-person screen mode within each screen line are distributed onto a larger number of picture points than in the single-person screen mode and the picture points in the multi-person screen mode are divided into a larger number of subgroups, for representing in each case a stereoscopic field, than in the single-person screen mode such that, in the single-person screen mode, the picture points are divided into two subgroups for representing in each case one of two stereoscopic fields while, in the multi-person screen mode, the picture points are divided into more than two subgroups for representing in each case one of more than two different stereoscopic fields, wherein the subpixels in the single-person screen mode, within the picture points, are activated with illumination intensities which are subpixel-dependently weighted in a manner such that a lateral distance of intensity centroids of adjacent picture points in the single-person screen mode differs from each integer multiple of a lateral distance of intensity centroids of adjacent picture points in the multi-person screen mode.

14. The method of claim 13, wherein for activating the subpixels with the illumination intensity weighted in a subpixel-dependent manner within each of the picture points, an intensity value for a picture point for each subpixel of the picture point, which results from the picture information of the fields, is multiplied by a value of a weighting function, wherein this weighting function is independent of the picture information and defines a weighting which is location-dependent within each screen line for each subpixel of the picture point.

15. The method of claim 13, wherein the subpixels in single-person screen mode within each of the picture points are activated in such a weighted manner that a distance of intensity centroids of laterally adjacent picture points differs from each integer multiple of a lateral distance of adjacent subpixels.

16. The method of claim 13, wherein the subpixels in the single-person screen mode within the picture points are activated with illumination intensities which are subpixel-dependently weighted in a manner such that a lateral distance of intensity centroids in a screen line of picture points situated closest to one another from one of the subgroups, in the single-person screen mode, differs from a lateral distance of intensity centroids in a screen line of picture points situated closest to one another from one of the subgroups, in the multi-person screen mode.

17. The method of claim 13, wherein the intensity centroids of the picture points of each subgroup in the single-person screen mode are placed such that light coming from each of these intensity centroids falls through the barrier raster centrally into the observation zone assigned to the respective subgroup, distanced to the barrier raster at a first observation distance, while the intensity centroids of the picture points of each subgroup in the multi-person screen mode are placed such that light coming from each of these intensity centroids falls through the barrier raster centrally into the observation zone assigned to the respective subgroup, distanced to the barrier raster at a second observation distance.

* * * * *